(12) United States Patent
Walker

(10) Patent No.: US 9,783,157 B2
(45) Date of Patent: Oct. 10, 2017

(54) SEATBELT BUCKLE SYSTEM

(71) Applicant: Robert G. Walker, Ossian, IN (US)

(72) Inventor: Robert G. Walker, Ossian, IN (US)

( * ) Notice: Subject to any disclaimer, the term of this patent is extended or adjusted under 35 U.S.C. 154(b) by 0 days.

(21) Appl. No.: 15/001,702

(22) Filed: Jan. 20, 2016

(65) Prior Publication Data

US 2017/0203715 A1    Jul. 20, 2017

(51) Int. Cl.
*B60R 22/36* (2006.01)
*B60R 22/18* (2006.01)
*B60R 22/00* (2006.01)

(52) U.S. Cl.
CPC ........ *B60R 22/36* (2013.01); *B60R 2022/003* (2013.01); *B60R 2022/1806* (2013.01); *B60R 2022/1812* (2013.01)

(58) Field of Classification Search
CPC .............. B60R 22/36; B60R 2022/003; B60R 2022/1806; B60R 2022/1812
See application file for complete search history.

(56) References Cited

U.S. PATENT DOCUMENTS

| | | | |
|---|---|---|---|
| 3,295,862 A | 1/1967 | Ebert | |
| 4,070,038 A | 1/1978 | Bergman et al. | |
| 4,451,087 A | 5/1984 | Tamamushi | |
| 4,569,190 A | 2/1986 | Gilmore | |
| 4,638,534 A | 1/1987 | Sasaki et al. | |
| 4,645,231 A | 2/1987 | Takada | |
| 4,676,555 A | 6/1987 | Tokugawa | |
| 4,676,556 A | 6/1987 | Yamanoi et al. | |
| 4,729,602 A | 3/1988 | Tokugawa | |
| 4,790,597 A | 12/1988 | Bauer et al. | |
| 4,923,214 A | 5/1990 | Siegrist et al. | |
| 5,048,865 A | 9/1991 | Tokugawa | |
| 5,064,220 A | 11/1991 | Ogawa | |
| 5,332,261 A * | 7/1994 | Siepierski | B60R 22/22 280/801.1 |
| 5,788,282 A * | 8/1998 | Lewis | B60R 22/105 280/808 |
| 6,520,392 B2 * | 2/2003 | Thibodeau | A44B 11/2549 15/105 |
| 6,902,195 B2 | 6/2005 | Ball et al. | |
| 6,969,122 B2 | 11/2005 | Sachs et al. | |
| 7,722,081 B2 | 5/2010 | Van Druff et al. | |
| 7,784,867 B2 * | 8/2010 | Lamparter | B60N 2/686 297/118 |
| 7,922,205 B2 | 4/2011 | David et al. | |
| 8,439,448 B2 * | 5/2013 | Murthy | B60N 2/065 297/468 |
| 8,517,424 B2 | 8/2013 | Brents | |
| 8,789,889 B2 | 7/2014 | Mitsuo et al. | |
| 9,022,483 B2 * | 5/2015 | Merrick | B60R 22/18 24/68 SB |
| 9,376,089 B1 * | 6/2016 | Bruderick | B60R 22/18 |

(Continued)

*Primary Examiner* — Drew J Brown
(74) *Attorney, Agent, or Firm* — Taylor IP, P.C.

(57) ABSTRACT

A seatbelt buckle system for law enforcement use, wherein the female portion of the buckle is located at the end of a segment which is in a generally upright and readily-accessible position to assure the safe and expeditious restraint of an individual. The individual securing the occupant is advantageously less prone to adverse events such as unwanted contact with or from the occupant, injury to the back or other part of the anatomy, or unwarranted charges of sexual harassment.

20 Claims, 5 Drawing Sheets

(56) References Cited

U.S. PATENT DOCUMENTS

2006/0231317 A1\* 10/2006 Yamaguchi ............. B60R 22/03
  180/268
2010/0141010 A1\* 6/2010 Hamsund ................ B60R 22/30
  297/468

\* cited by examiner

SEATBELT BUCKLE SYSTEM

BACKGROUND OF THE INVENTION

1. Field of the Invention

The present invention relates to seatbelts used to restrain occupants in a vehicle, and, more specifically to seatbelts used in law enforcement vehicles.

2. Description of the Related Art

It is well known in the art to use seatbelts in automobiles or other vehicles in order to restrain occupants in the event of a collision or other adverse event.

Although the primary purpose of seatbelts is to provide safety for occupants of vehicles, a secondary purpose for law enforcement is to use seatbelts to restrain an occupant to prevent them from harming themselves or others during transportation or while the vehicle is not in motion.

Seatbelts are comprised of two or more sections that link together with the occupant between the seatbelt and the seat. The seatbelt is attached to some portion of the vehicle in order to provide the necessary restraint needed to counteract the forces of a collision or other adverse event.

During use, the occupant is seated in a desired position and pulls at least two sections of seatbelt together and fastens them. Typically, the fastening mechanism involves a female section of a buckle on a non-anchored section and a male section of a buckle on an anchored section.

It is also well-known in the art to provide extensions for seatbelts in the event that the occupant is too large to fit between a standard coupled seatbelt and the seat. Such extensions typically have a male section of a buckle on one end and a female section of a buckle on the other end, and are provided in various lengths to extend the operative length required for the occupant. In extreme cases, two or more extensions can be used.

In some instances, the occupant needs assistance with operating the seatbelt themselves. Some of these instances are people with infirmities, the elderly, the very young, or people with cognitive difficulties. Assistance can then be provided by someone else to restrain the occupant.

In law enforcement situations, it is normal to have the operation of the seatbelt restraint of an occupant performed by law enforcement personnel rather than by themselves. There is a duty to transport the occupant in a safe manner, should a collision or other adverse event occur.

In addition to the safe transportation of occupants, there are often situations where it is desired to restrain them from harming themselves or others while in the vehicle, the vehicle being in motion or at rest. When placed securely in the seat by the seatbelt, the occupant then has limited movement.

Often in these law enforcement situations, the occupant has been previously restrained by handcuffs or other restraining mechanisms; in such cases, it is impossible for the individual to restrain themselves with the seatbelt.

In these situations as well, the occupant may be combative and/or under the influence of drugs or alcohol, and therefore pose a danger to themselves or the law enforcement personnel attempting to restrain them in the vehicle. This applies even if the occupant has been previously restrained by handcuffs or other restraining means, as the occupant has several means with which to harm himself or others. These means may include biting, kicking, lunging, grabbing, striking, scratching, head-butting, or other altercations.

When restraining an occupant, it is necessary for the law enforcement personnel to lean inside the vehicle and over/across the occupant in order to buckle the seatbelt. This leaves that person or persons extremely vulnerable to any or more of the adverse consequences mentioned above. Additionally, injury to the back or other anatomic area may occur as a result of the awkward positioning needed to operate the seatbelt. Finally, the occupant may falsely claim the law enforcement personnel was sexually harassing them as a result of the close proximity between the two.

Typically with present vehicles, the law enforcement personnel must reach over to "fish around" for the section on the opposite side of the occupant, that section possibly lying under the occupant or between parts of the seat or otherwise not readily accessible. This is a time of typically high stress and urgency, where expediency is critical to complete the buckling operation.

What is therefore needed in the art is a seatbelt apparatus that allows someone to safely and expeditiously operate buckling of the seatbelt for an occupant who is not permitted to, physically restrained from, or incapable of operating it themselves.

SUMMARY OF THE INVENTION

The present invention provides a seatbelt buckle system which provides a way to safely and quickly buckle together sections of a seatbelt to restrain the occupant of a vehicle.

The invention in one form is directed to a seatbelt buckle system comprising a first restraining apparatus which includes a male portion of a buckle on a section of flexible material anchored at each end to first and second portions of a vehicle, and a second restraining apparatus which includes a female portion of a buckle on a segmented section anchored to a third portion of the vehicle.

The invention in another form is directed to a seatbelt buckle system comprising a first restraining apparatus which includes a male portion of a buckle on a section of flexible material anchored at one end to a first portion of a vehicle and the other end anchored at a second portion of the vehicle with a spool between the two anchors, and a second restraining apparatus which includes a female portion of a buckle on a generally upright end of a segmented section anchored to a third portion of the vehicle.

The invention in another form is directed to a seatbelt buckle system comprising a first restraining apparatus which includes a male portion of a buckle on a section of flexible material anchored at one end to a first portion of a vehicle and the other end anchored at a second portion of the vehicle with a spool between the two anchors, and a second restraining apparatus which includes a female portion of a buckle on a generally upright end of a section with a male portion of a buckle at the opposite end for buckling into the female portion of an existing seatbelt buckle.

The invention in still another form is directed to a seatbelt buckle system comprising a first restraining apparatus which includes a male portion of a buckle on a section of flexible material anchored at one end to a first portion of a vehicle and the other end anchored at a second portion of the vehicle with a remotely-actuable spool between the two anchors, and a second restraining apparatus which includes a female portion of a buckle on a generally upright end of a segmented section anchored to a third portion of the vehicle.

An advantage of the present invention is the restraint of an occupant in a vehicle can be performed in a quick and repeatable manner.

Another advantage of the present invention is that as a result of the ease and accessibility of the seatbelt components, there is a degree of added safety for both the occupant and the individual restraining the occupant.

Still another advantage of the present invention is that as a result of the ease and accessibility of the seatbelt components, the individual restraining the occupant may be less prone to back or other injuries.

Another advantage of the present invention is a reduction in unfounded sexual harassment charges, as the individual and the occupant being restrained are at a greater distance from each other than when operating a standard seatbelt.

Still another advantage of the present invention is that the spool can be remotely actuable to lock and/or retract the coupled seatbelt when the door closes so the restraining individual cannot pull out more belting and create slack.

Yet another advantage of the present invention is that the spool can be remotely actuable to lock and/or retract the coupled seatbelt by an individual from the operating position of the vehicle while it is in motion or at rest, in the event that the occupant is not secure or it is necessary to further secure the occupant.

An advantage of an embodiment of the present invention is the ability to use it with existing seatbelts.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "seatbelt", "restraint", "vehicle", and "buckle" are used principally throughout this specification for convenience but it is to be understood that these terms are not intended to be limiting.

Figure 1:
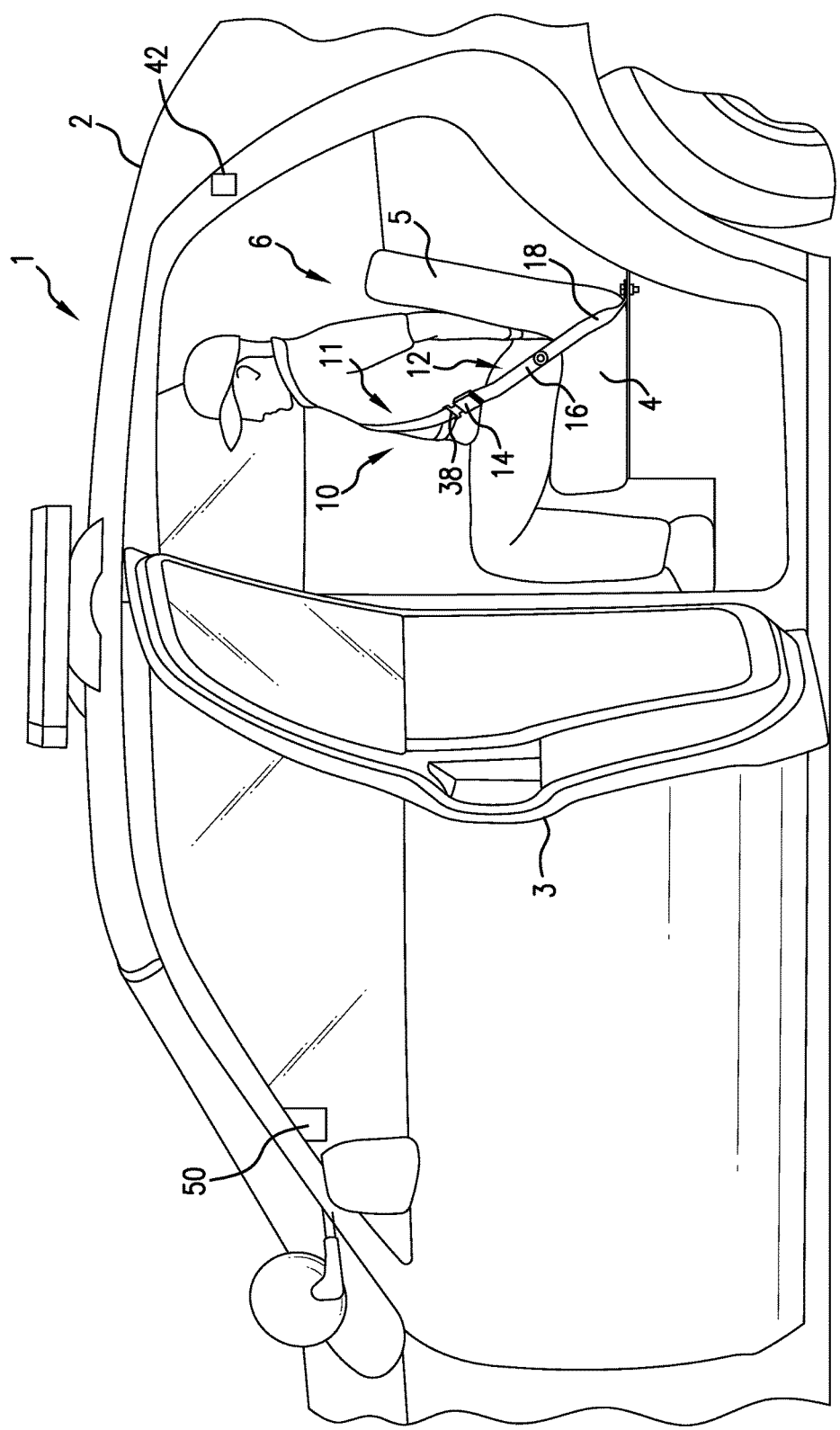
FIG. 1 is a side view of an occupant restrained by an embodiment of a seatbelt buckle system of the present invention showing the first and second restraining apparatuses as disclosed herein.
Figure 2:
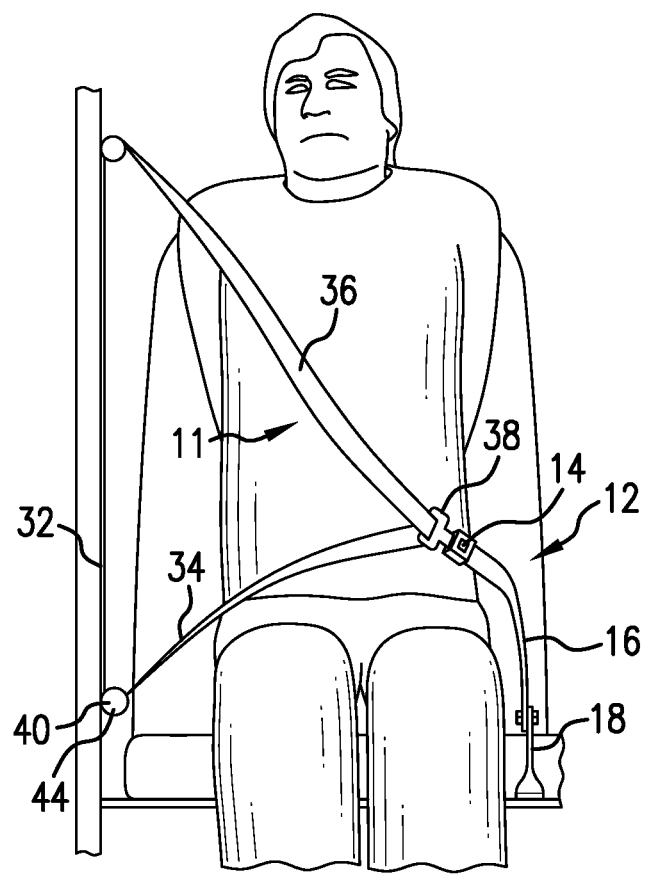
FIG. 2 is a front view of the occupant of FIG. 1.

Referring now to the drawings, and more particularly to FIGS. 1-2, there is shown a vehicle 1 in the form of an automobile, which generally includes a chassis 2, a door 3, a seat 4, seat back 5, and a rear seating arrangement 6; having an embodiment of a law enforcement seatbelt buckle system 10 of the present invention. Seatbelt buckle system 10 includes a first restraining apparatus 11 and a second restraining apparatus 12.

First restraining apparatus 11 includes a first end 32, a second end 34, a length of flexible material 36 between and connecting first end 32 and second end 34, and a buckle male portion 38 slidably disposed along the length of flexible material 36. Additionally, first restraining apparatus 11 includes a spool 40, upon which flexible material 36 is wrapped at or near second end 34. Buckle male portion 38 is substantially similar to the male portion of seatbelt buckles currently being manufactured and used in automobiles, airplanes and other vehicles.

Spool 40 operates under tension to remove any slack in seatbelt buckle system 10 when it is buckled together, or to remove any slack in first restraining apparatus 11 when not in use. The spool also selectively locks to prevent unwrapping of the flexible material 36 in the event of a collision of vehicle 1 or sudden movement of the occupant.

Advantageously, door switch 42 on chassis 2 may be used to actuate the locking feature of spool 40 when the door 3 of vehicle is closed, thereby optimally securing the occupant. Alternatively or additionally, dashboard switch 50 may be used to actuate spool 40 into a locked position and/or perform additional wrapping of flexible material 36 around spool 40, thereby optimally securing the occupant as explained further in this specification.

Figure 3:
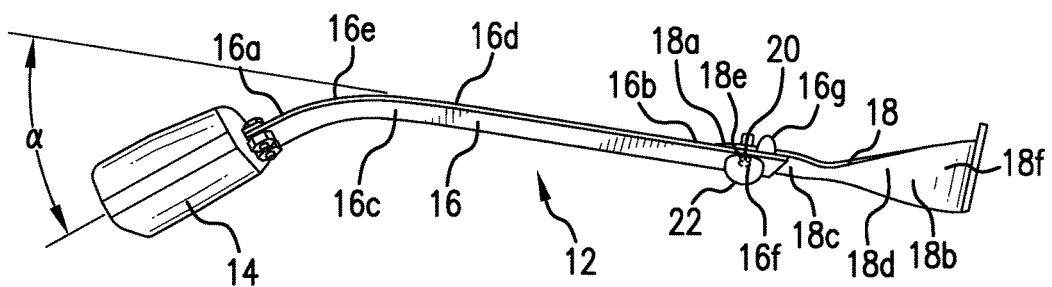
FIG. 3 is an isometric view of the second restraining apparatus of the embodiment of FIG. 1.
Figure 4:
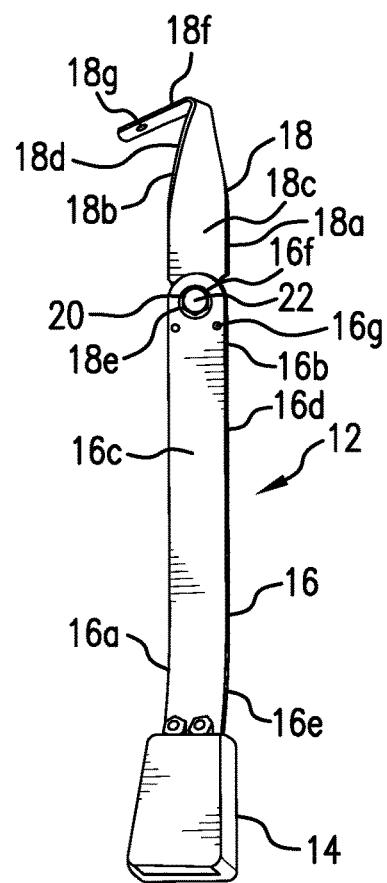
FIG. 4 is a top view of the second restraining apparatus of the embodiment of FIG. 1 in an extended position.
Figure 5:
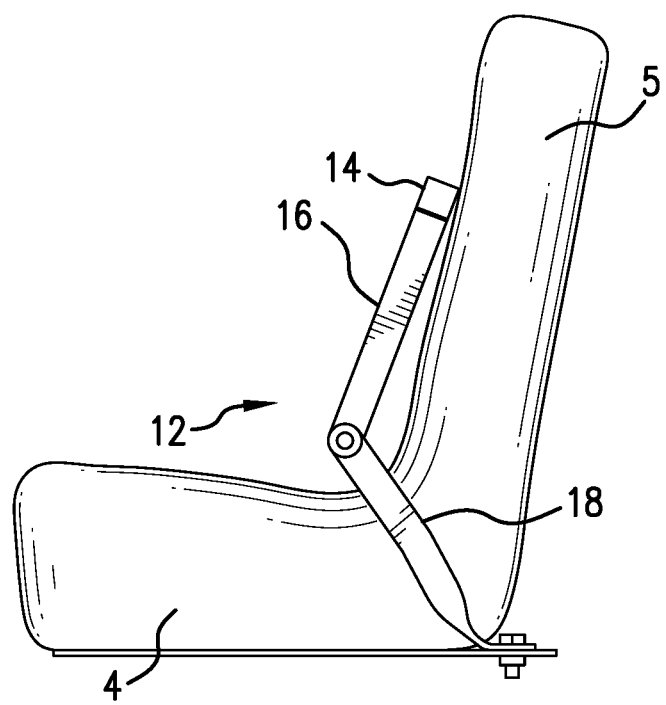
FIG. 5 is a side view of the second restraining apparatus of the embodiment of FIG. 1 in a folded position.

Now, additionally referring to FIGS. 3-5, second restraining apparatus 12 of seatbelt buckle system 10 is described. Second restraining apparatus 12 includes a buckle female portion 14, a first segment 16, a second segment 18 and a pivot point 20. Buckle female portion 14 is substantially similar to the female portion of seatbelt buckles currently being manufactured and used in automobiles, airplanes and other vehicles, and may be adapted to connect to first segment 16 in a rigid manner.

First segment 16 is a rigid member with proximal end 16a, distal end 16b, top side 16c, and bottom side 16d. There is a bend 16e toward the proximal end 16a, which is attached to buckle female portion 14. Bend 16e is at an angle α to axis A-A, which runs longitudinally through the unbent section of first segment 16. Angle α may be any angle greater than 0 degrees and less than 90 degrees, and is preferably 45 degrees. Distal end 16b includes through hole 16f and protrusion 16g. The protrusion 16g may be manufactured integrally with first segment 16, or may be a separate component such as a roll pin or spring pin. For the purpose of discussion, first segment 16 may be made of steel, plastic, composite, or any other non-webbed material.

Second segment 18 is a rigid member with proximal end 18a, distal end 18b, top side 18c, and bottom side 18d. Proximal end 18a includes through hole 18e. Distal end 18b includes flange 18f with through hole 18g. For the purpose of discussion, second segment 18 may be made of steel, plastic, composite, or any other non-webbed material.

The hole 18g on flange 18f of second segment 18 is used as a connection point for anchoring second restraining apparatus 12 to chassis 2 or another portion of vehicle 1. The connection point can be that utilized by a conventional seatbelt system, and that system can remain in the vehicle with the present invention being added thereto.

First segment 16 and second segment 18 are pivotally connected by rivet 22 at pivot point 20 through holes 16f and 18e. Second segment 18 is preferably longer than first segment 16, and has a length and shape to extend from the connection point on the chassis 2 of the vehicle 1 to where pivot point 20 is in a location at or above where the seat 4 and seat back 5 of the rear seating arrangement 6 meet (see FIG. 1).

First segment 16 and second segment 18 are arranged so that first segment 16 pivots about pivot point 20 and moves in a generally vertical manner, allowing first segment 16 to fold up against the back of the seat back 5 when desired (FIG. 5). When first segment 16 is folded up against the seat back 5, for example, an individual can be placed into vehicle 1 in a generally horizontal manner and not impede the operation of buckling the seatbelt buckle system 10.

The movement-limiting protrusion 16g serves to limit the pivotal movement of first segment 16 relative to second segment 18, so that when first segment 16 is moved to its desired position as shown in FIG. 1 it can be easily accessed by law enforcement personnel without falling down to the seat 4. The movement-limiting protrusion 16g limits a pivotal range of the first rigid segment 16 relative to the second rigid segment 18 so that the female portion of the buckle 14 cannot descend to the topmost surface of the seat 4 for easy access by law enforcement personnel. As seen in FIG. 5, first rigid segment 16 extends at least half way up seat back 5 as buckle 14 is proximate to seat back 5 when first rigid segment 16 is in a generally vertical position.

Figure 6:
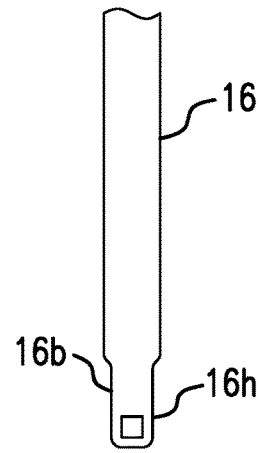
FIG. 6 is a top view of a portion of an alternate embodiment of the present invention.

In an alternate embodiment illustrated in FIG. 6, first segment 16 as described above—with the exception of no through hole 16f or protrusion 16g—has distal end 16b now include buckle male portion 16h, which is in the shape of the male portion of a standard seatbelt buckle. In this embodiment, first segment 16 can be used in vehicles with a standard seatbelt arrangement and without second segment 18.

Now referring again to FIGS. 1-2, a handcuffed individual is shown after assembly of seatbelt buckle system 10. It should be noted that buckle female portion 14 is in a position that is readily accessible, as opposed to being located at or under where the occupant contacts the seat 4. Advantageously, in addition to the safe and expeditious restraint of the individual, unbuckling of seatbelt buckle system 10 can be accomplished in the same manner.

A method of restraining an occupant with the invention is hereby described. The occupant is placed by an individual into vehicle 1 onto rear seating arrangement 6 with first restraining apparatus 11 on one side of him, and second restraining apparatus 12 on the other side of him. Grasping buckle male portion 38 and/or flexible material 36 with one or both hands, the individual urges first restraining apparatus 11 toward second restraining apparatus 12, unwrapping flexible material 36 from around spool 40. Buckle female portion 14 on the end of first segment 16 is already in an exposed and readily-accessible location, proximate to and away from seat 4. Because first segment 16 is non-webbed and rigid, the individual can then connect buckle male portion 38 with buckle female portion 14 with relative ease.

Figure 7:
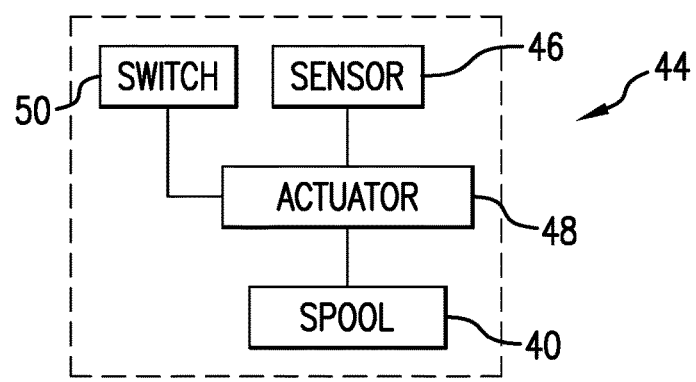
FIG. 7 is a schematic illustration of an activatable restraint system disclosed herein.

After the occupant is restrained in vehicle 1 by seatbelt buckle system 10, door 3 is closed. When door 3 closes against chassis 2, activatable restraint system 44 may be operated (see FIG. 7). Activatable restraint system 44 includes a sensor 46, an actuator 48, and a spool 40. An embodiment of sensor 46 of activatable restraint system 44 may be door switch 42, which signals actuator 48 to activate spool 40 to remove any slack in seatbelt buckle system 10 and/or lock spool 40 so as to not allow any unwrapping of flexible material 36. Alternatively or additionally, dashboard switch 50 may be used to remove any slack in seatbelt buckle system 10 and/or lock spool 40 so as to not allow any unwrapping of flexible material 36.

By the advantageous use of this invention, the occupant is quickly and securely restrained and will remain so while vehicle 1 is at rest or in motion. Further, the individual restraining the occupant has enjoyed the decreased possibility of harmful contact from the occupant, the decreased possibility of injury as a result of awkward movements or stance during the buckling procedure, and the decreased instances of false accusations of sexual harassment by the occupant as a result of the expedience of the buckling procedure as well as an increased distance between the individual and the occupant.

Although the present invention has been discussed relative to an occupant in the rear seat of a vehicle, the present invention may also be utilized in the front seat of the vehicle, allowing an law enforcement officer for example to more easily access the seatbelt buckle, particularly considering bulky equipment worn by the officer.

While a seatbelt apparatus has been described with respect to law enforcement use, the present invention can be used in any vehicle or for any purpose. Examples include but are not limited to child restraint seats and seating for handicapped individuals.

While a seatbelt apparatus has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seatbelt buckle system, comprising:
  a first restraining apparatus, the first restraining apparatus including:
    a first end attached to a first portion of a vehicle;
    a second end attached to a second portion of the vehicle;
    a length of flexible material connecting the first end and the second end; and
    a male portion of a buckle slidably disposed on the length of flexible material, wherein the second end is attached to a spool at or before the attachment at the second portion of the vehicle, the spool selectively urging a portion of the length of flexible material to wrap around the spool; and
  a second restraining apparatus, the second restraining apparatus including:
    a first rigid segment with a proximal end and a distal end;
    a second rigid segment with a proximal end and a distal end, the distal end attached to a third portion of the vehicle, the distal end of the first rigid segment being pivotally attached to the proximal end of the second rigid segment, the third portion of the vehicle being generally beneath or behind a seat of the vehicle;
    a female portion of a buckle attached to the proximal end of the first rigid segment, wherein the location of the pivotal attachment of the distal end of the rigid second segment and the proximal end of the first rigid segment is located at or above a topmost surface of a generally horizontal portion of the seat of the vehicle, the female portion of the buckle and the first rigid segment being positionable about the pivotal attachment of the first rigid segment to the second rigid segment so that the first rigid segment is generally vertical with the female portion of the buckle being proximate a back of the seat; and
    a movement-limiting protrusion proximate to the pivotal attachment of the first rigid segment to the second rigid segment, the movement-limiting protrusion limiting a pivotal range of the first rigid segment relative to the second rigid segment so that the female portion of the buckle cannot descend to the topmost surface of the seat.

2. The seatbelt buckle system of claim 1, wherein the length of the second rigid segment is greater than the length of the first rigid segment.

3. The seatbelt buckle system of claim 1, wherein the first rigid segment is composed of a non-webbed material.

4. The seatbelt buckle system of claim 1, wherein the first rigid segment is normally disposed in a generally upright position when not connected to the first restraining apparatus.

5. The seatbelt buckle system of claim 1, wherein the female portion of the buckle is not located at or under where an occupant would contact the seat.

6. The seatbelt buckle system of claim 1, wherein the spool locks and prevents the length of flexible material from unwrapping around the spool.

7. The seatbelt buckle system of claim 1, wherein excess flexible material is wrapped around the spool to remove slack.

8. The seatbelt buckle system of claim 1, further comprising an activatable restraint system coupled to the first restraining apparatus.

9. The seatbelt buckle system of claim 8, wherein the activatable restraint system includes a sensor, an actuator, and the spool; whereby the sensor signals the actuator to interact with the spool to wrap excess flexible material around the spool to remove slack.

10. The seatbelt buckle system of claim 8, wherein the activatable restraint system includes a sensor, an actuator, and the spool; whereby the sensor signals the actuator to lock the spool to prevent the flexible material from unwrapping around it.

11. A vehicle, the vehicle comprising:
a chassis;
a motor connected to the chassis;
wheels connected to the chassis; and
a seatbelt buckle system, comprising:
a first restraining apparatus, the first restraining apparatus including:
a first end attached to a first portion of the vehicle,
a second end attached to a second portion of the vehicle,
a length of flexible material connecting the first end and the second end, and
a male portion of a buckle slidably disposed on the length of flexible material,
wherein the second end is attached to a spool at or before the attachment at the second portion of the vehicle, the spool selectively urging a portion of the length of flexible material to wrap around the spool; and
a second restraining apparatus, the second restraining apparatus comprising:
a first rigid segment with a proximal end and a distal end;
a second rigid segment with a proximal end and a distal end, the distal end attached to a third portion of the vehicle, the distal end of the first rigid segment being pivotally attached to the proximal end of the second rigid segment, the third portion of the vehicle being generally beneath or behind a seat of the vehicle;
a female portion of a buckle attached to the proximal end of the first rigid segment, wherein the location of the pivotal attachment of the distal end of the second rigid segment and the proximal end of the first rigid segment is located at or above a topmost surface of a generally horizontal portion of the seat of the vehicle, the female portion of the buckle and the first rigid segment being positionable about the pivotal attachment of the first rigid segment to the second rigid segment so that the first rigid segment is generally vertical with the female portion of the buckle being proximate a back of the seat; and
a movement-limiting protrusion proximate to the pivotal attachment of the first rigid segment to the second rigid segment, the movement-limiting protrusion limiting a pivotal range of the first rigid segment relative to the second rigid segment so that the female portion of the buckle cannot descend to the topmost surface of the seat, the female portion of the buckle is not located at or under where an occupant would contact the generally horizontal portion of the seat.

12. The vehicle of claim 11, wherein the length of the second rigid segment is greater than the length of the first rigid segment.

13. The vehicle of claim 11, wherein the first rigid segment is composed of a non-webbed material.

14. The vehicle of claim 11, wherein the first rigid segment is normally disposed in a generally upright position when not connected to the first restraining apparatus.

15. The vehicle of claim 11, wherein the first rigid segment extends at least half way up the back of the seat when the first rigid segment is in a generally vertical orientation.

16. The vehicle of claim 11, wherein the spool locks and prevents the length of flexible material from unwrapping around the spool.

17. The vehicle of claim 11, wherein excess flexible material is wrapped around the spool to remove slack.

18. The vehicle of claim 11, further comprising an activatable restraint system coupled to the first restraining apparatus.

19. The vehicle of claim 18, wherein the activatable restraint system includes a sensor, an actuator, and the spool; whereby the sensor signals the actuator to interact with the spool to wrap excess flexible material around the spool to remove slack.

20. The vehicle of claim 18, wherein the activatable restraint system includes a sensor, an actuator, and the spool; whereby the sensor signals the actuator to lock the spool to prevent the flexible material from unwrapping around it.

* * * * *